Figures 1, 2:
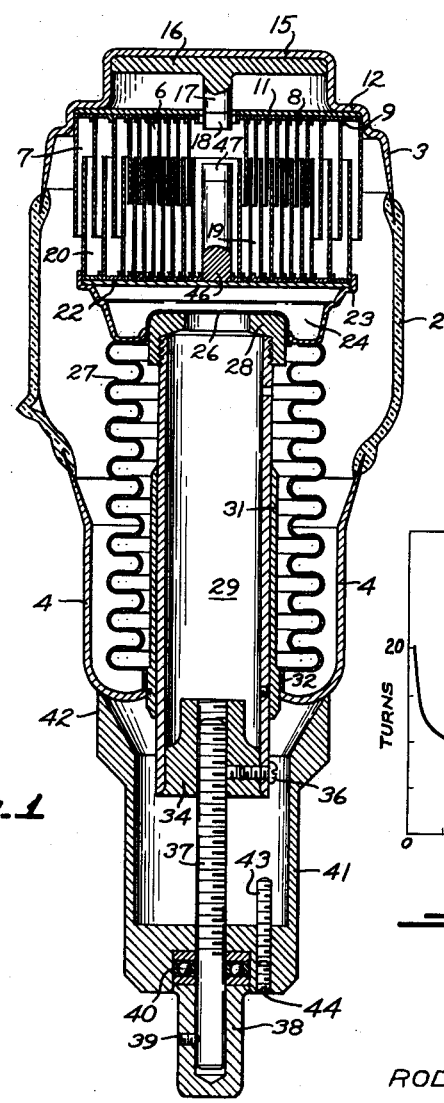

June 19, 1962  R. W. NEIBAUR  3,040,220
VACUUM VARIABLE CAPACITOR
Filed July 16, 1957

INVENTOR.
RODERICK W. NEIBAUR
BY Charles S. Evans
his ATTORNEY though not shown, by brazing, welding or other suitable means.

3,040,220
VACUUM VARIABLE CAPACITOR
Roderick W. Neibaur, San Jose, Calif., assignor, by mesne assignments, to Jennings Radio Manufacturing Corporation, San Jose, Calif., a corporation of Delaware
Filed July 16, 1957, Ser. No. 672,303
4 Claims. (Cl. 317—245)

My invention relates to vacuum variable capacitors and one of the objects of the invention is the provision of such a capacitor having an extended capacity and voltage range.

Another object of the invention is the provision in such a capacitor of a switch within the vacuumized envelope, which will short out the condenser plates automatically after maximum capacity has been attained.

Another object of the invention is the provision of an antenna tuning capacitor combining in one small implement having a single control, the desirable characteristics of several capacitors, and having high voltage characteristics and high current carrying capacity.

Still another object is the provision of a capacitor including a shorting-out switch in which the number of components is markedly lessened and residual or distributed capacity, which is detrimental to high frequency operation, substantially reduced. This is accomplished by utilizing a single mobile structure for varying the interlapping relation of the condenser plates and engaging or disengaging contact electrodes.

Another object of the invention is the provision of a vacuum capacitor in which the electrostatic field about the feather-edged copper seals is minimized, so that when large currents are involved dangerous heating of the glass is avoided.

Still another object is the provision of a capacitor having a non-linear change in voltage characteristics as well as in capacitance; and which can be used to produce resonance in the antenna by adjusting the capacitor and also an inductance in series therewith, without change in antenna length.

The invention possesses other objects some of which with the foregoing will be brought out in the following description of the invention. I do not limit myself to the showing made by the said description and the drawings, since I may adopt variant forms of the invention within the scope of the appended claims.

Referring to the drawings:

FIG. 1 is a vertical half sectional view, taken in the plane of the longitudinal axis of the implement. The condenser plates are shown in meshed relation corresponding to a high capacity range. The scale is approximately full size.

FIG. 2 is a graph showing capacity and voltage of one of my capacitors with relation to turns of the adjusting screw.

In electronics or transmitting equipment where wide frequency coverage is required, wide range capacitors are an essential component in their design and application. Capacitors used in the final amplifier stage are generally of a type having a very low minimum and a very large maximum capacity. Ranges from 10 to 200 mmfds. have been considered excellent, but my new capacitor provides a range from 25 to 2000 mmfds.

Another problem concerns the production of resonance in the antenna. With a fixed length of antenna wire and low frequencies, the voltages across the condenser are low and the capacity is usually in the maximum region.

As the frequencies are increased, the capacity must be decreased to produce a resonant condition, so that as the frequencies are increased toward their maximum value, the minimum capacitance is approached in the capacitor. Under these conditions the voltages appearing across the condenser plates will be extremely high as compared to the same power level when the capacity was at maximum. The voltage ranges in an antenna capacitor can vary up to twenty times; that is, if the maximum voltage at maximum capacity is 200 volts, 4,000 volts at minimum capacity and highest frequency could be expected. My capacitor as herein described provides efficient means for handling these vast differences in potentials.

By using plates of different length and with different spacing between plates, in accordance with a calculated pattern a nonlinear or compensated change in capacity and voltage characteristics follows each turn of the spindle, so that my capacitor may be designed specifically to give the voltage and capacity characteristics required for its intended use.

My capacitor also includes a switch within the vacuum chamber, by which the condenser plates may be shorted out at maximum capacity. At maximum capacity, the circuit is open. With only a slight movement of the mobile plates toward the fixed plates, the contact electrodes meet and the capacitor is no longer in circuit. When it is necessary for one reason or another to change frequency in the antenna, the capacitor is adjusted to the indicated capacity, the first turning of the knob separating the contact electrodes and placing the capacitor again in the circuit to function as designed.

In detail my capacitor comprises a vacuumized envelope including a dielectric shell 2 of generally cylindrical shape, and closed at opposite ends by metal end caps 3 and 4 which constitute external electrodes for the capacitor. Fixed within the end caps 3 are two different groups or sets, 6 and 7, of concentric cylindrical condenser plates.

The inner set 6 of plates is shorter and contains more plates, set closer together than the outer set 7 of which the plates are fewer in number, longer and spaced farther apart. The inner set 6 of plates provides the low voltage portion of my capacitor as well as the bulk of the capacitance.

Each of the plates in both sets is formed with an internal flange 8, extending radially inwardly and then backwardly in a return flange 9, concentric with the cylindrical main or body portion of the plate.

The proportions and sizes of the plates are such that the return flange of each plate forms a snug push fit with the outside face of the body portion of the next smaller plate, so that the assembled plates tend to remain together and can be handled as a unit during assembly and final brazing together; at which time, the radial portions of the flanges lie flat against the final back plate 11, which is seated against and brazed to the shoulder 12 of the end cap as shown, so that end cap, back plate and condenser plates of both sets are integrally united.

The end wall 15 of the end cap 3 is provided with a heavy integral boss 16 from which a copper contact rod 17, integrally united with boss and wall, extends inwardly through a central opening in the base plate, terminating near the base plate in a tungsten tip 18, constituting with the contact rod a fixed contact electrode.

Concentrically disposed opposite the fixed assembly of condenser plates 6 and 7 just described, and in cooperative relation therewith is a mobile assembly of condenser plates and mounting means therefor so that the mobile assembly may be brought into an interlapping or intermeshing relation in varying degree with the fixed assembly.

The plates of the mobile assembly are also in two groups or sets 19 and 20, all of the same length as the fixed plates 7, but the inner plates 19 spaced to intermesh with the fixed plates 6 and the outer plates 20 spaced to intermesh with the fixed plates 7.

Individually, the mobile plates have radial and return flanges like the fixed plates, and are integrally united, as by brazing, to the mobile back plate 22, brazed within the flanged rim 23 of the crown 24, which overlies the end 26 of the bellows 27. A reenforcing ring 28 is brazed inside the bellows end; and an operating stem 29 is threaded and brazed into the ring.

The stem is carried in a bearing tube 31 brazed to and extending concentrically flange-like inwardly into the envelope from the outer extremity of the end cap 4. The outer rim 32 of the bellows closely surrounds the bearing tube and is integrally united thereto near its juncture with the end cap, so that all three, bearing tube, bellows and end cap are integrally united.

A plug 34 fixed in the outer end of the stem 29 by the screw 36 receives the central operating screw spindle 37; which is turned to adjust the condenser plates by the knob 38 fixed on the end of the spindle by the screw 39. A ball bearing 40 is interposed between the knob and a hood 41, surrounding the projecting end of the stem and having a flared peripheral flange 42 bearing against the end cap. A screw spindle 43 threaded into the hood provides an adjustable stop to limit withdrawal of the mobile assembly. The spindle is fixed in its adjustment by the set screw 44.

Integrally united to the mobile base plate 22 and concentric with the condenser plates 19 is a mobile contact rod 46, terminating in a tungsten tip 47. Tip and rod constitute a mobile contact electrode which is axially in alignment with the fixed electrode 18.

In the embodiment shown in the drawing, the sizes of the cylindrical condenser plates and their spacing is such that when the plates are fully intermeshed, there is approximately .012 of an inch between fixed plates of the inner set 6 and the intermeshed mobile plates 19. Between fixed plates 7 and the intermeshed mobile plates 20, there is approximately .04 of an inch. These spacings cannot of course be accurately shown in the drawing.

The wider spaced plates provide an added voltage breakdown which operates from 10 kv. to 20 kv. The closely spaced plates will operate from 3 kv. to 8 kv. before unmeshing. Since the wider spaced plates are the last to unmesh, there is set up a residual capacity which allows going to the higher voltages; and after unmeshing the wider spaced plates, I can go to potentials of approximately 40 kv.

As the mobile plates start to intermesh with the fixed plates 7, voltage is at maximum and capacitance at the minimum. With each turn of the adjusting screw to further intermesh the plates, the capacitance increases, slowly at first and then as the fixed plates 6 are reached, at augmented ratio.

As the mobile plates near the end of their inward movement, capacitance reaches its maximum range with a corresponding minimum voltage. With further inward movement, the tungsten tips 18 and 47 meet, shorting out the plates by a direct connection through the implement. A backward turn of the adjusting screw separates the contact electrodes and inserts the capacitor in the circuit with capacitance in the high range and voltage in the low. Further adjustment is then made according to need.

The pattern for these changes in capacitance and voltage is dependent on the area of lap in the intermeshed plates with relation to axial movement of the mobile plates during each turn of the adjusting screw, and these factors may be selected to meet the requirements of the user.

I claim:

1. A vacuum variable condenser comprising a vacuumized envelope having oppositely disposed metal end caps hermetically united by a dielectric shell interposed therebetween, an assembly of fixed concentric cylindrical condenser plates mounted on one of the end caps within the envelope, an assembly of mobile concentric cylindrical condenser plates mounted on the other end cap within the envelope, one assembly of condenser plates having at least two concentric groups of plates of unequal length and spacing with the plates within each group being of uniform length and spacing and the ends of the plates in each group lying in planar alignment, the other assembly of condenser plates having at least two concentric groups of plates of equal length but unequal spacing with the plates of each group being of uniform length and spacing and with ends lying in planar alignment, and means mounted on said other end cap for moving the mobile assembly of condenser plates axially into and out of intermeshing relation to the fixed assembly of condenser plates.

2. A vacuum variable condenser comprising a vacuumized envelope having oppositely disposed metal end caps hermetically united by a dielectric shell interposed therebetween, a fixed contact electrode mounted on one of the end caps and extending into the envelope, an assembly of at least two groups of fixed condenser plates concentrically mounted on said end cap about the fixed contact and having a group of outer plates of greater length than another group of inner plates, an assembly of mobile condenser plates mounted on the other end cap within the envelope and concentrically arranged for intermeshing relation first with said group of outer plates and then with the group of inner fixed condenser plates, a mobile contact electrode in operative alignment with the fixed contact electrode and mounted on said other end cap to engage the fixed electrode when the mobile condenser plates are in maximum intermeshed relation to both inner and outer groups of fixed condenser plates, and means for moving the mobile assembly of condenser plates axially into and out of interlapping relation to the fixed assembly of condenser plates, and said fixed and mobile contact electrodes into and out of engagement.

3. A vacuum variable condenser comprising a vacuumized envelope having oppositely disposed hollow metal end caps hermetically united by a dielectric shell interposed therebetween, an apertured base plate transversely arranged in one of the end caps and integrally united therewith, an assembly of fixed concentric cylindrical condenser plates integrally mounted on the base plate about the aperture and extending into the envelope, selected plates of the assembly being longer than other plates, a bearing tube fixed in the other end cap and extending into the envelope, a stem journaled in the bearing tube, a bellows hermetically surrounding the bearing tube and integrally united with said other end cap and the stem, a mobile base plate integrally united to the bellows and stem at their juncture, an assembly of mobile concentric cylindrical condenser plates integrally mounted on the mobile base plate for interlapping relation to the fixed condenser plates, means for moving the stem axially in the bearing tube to intermesh the mobile condenser plates with the fixed condenser plates, and fixed and mobile contact electrodes integrally united with the end caps, one of said contact electrodes extending through the aperture in said apertured base plate and arranged to engage the other contact electrode when the fixed and mobile condenser plates are in the maximum intermeshing relation.

4. A vacuum variable condenser comprising a vacuumized envelope having oppositely disposed axially aligned metal end caps hermetically united by a dielectric shell interposed therebetween, an assembly of fixed concentric cylindrical condenser plates mounted on one of the end caps within the envelope, an assembly of mobile concentric cylindrical condenser plates mounted on the other end cap within the envelope and movable axially into and out of intermeshing relation with the fixed plates, a fixed contact electrode mounted on and integral with the end cap adjacent the fixed condenser plates and concentric therewith, a mobile contact electrode axially aligned with said fixed contact electrode mounted on and integral with the other end cap adjacent the mobile condenser plate assembly and movable axially therewith, said fixed and mobile contact electrodes being of a length to engage when the mobile condenser plates are fully intermeshed with the fixed condenser plates.

References Cited in the file of this patent

UNITED STATES PATENTS

| | | |
|---|---|---|
| 1,718,138 | Grimditch | June 18, 1929 |
| 1,844,930 | Cahusac | Feb. 16, 1932 |
| 2,147,425 | Bock | Feb. 14, 1939 |
| 2,339,663 | Teare | Jan. 18, 1944 |
| 2,500,875 | Shupbach | Mar. 14, 1950 |
| 2,698,405 | True | Dec. 28, 1954 |
| 2,889,501 | Wilkens | June 2, 1959 |

FOREIGN PATENTS

| | | |
|---|---|---|
| 210,577 | Great Britain | Feb. 7, 1924 |